(12) United States Patent
Elbaum et al.

(10) Patent No.: US 8,074,874 B2
(45) Date of Patent: Dec. 13, 2011

(54) SECURE PAYMENT SYSTEM

(75) Inventors: Hector Daniel Elbaum, Templestowe (AU); Andrew Jamieson, Brunswick (AU); David McGregor, Wheelers Hill (AU)

(73) Assignee: Point of Paypty Ltd, Victoria (AU)

( * ) Notice: Subject to any disclaimer, the term of this patent is extended or adjusted under 35 U.S.C. 154(b) by 674 days.

(21) Appl. No.: 10/580,663

(22) PCT Filed: Nov. 26, 2004

(86) PCT No.: PCT/AU2004/001663
§ 371 (c)(1),
(2), (4) Date: Mar. 23, 2007

(87) PCT Pub. No.: WO2005/052801
PCT Pub. Date: Jun. 9, 2005

(65) Prior Publication Data
US 2007/0170245 A1 Jul. 26, 2007

(30) Foreign Application Priority Data
Nov. 26, 2003 (AU) .............................. 2003906527

(51) Int. Cl.
*G06K 5/00* (2006.01)

(52) U.S. Cl. ....................................... 235/380; 235/382

(58) Field of Classification Search .................. 235/379, 235/380, 382, 385, 487, 492
See application file for complete search history.

(56) References Cited

U.S. PATENT DOCUMENTS

| | | | |
|---|---|---|---|
| 5,809,143 A | 9/1998 | Hughes | |
| 6,014,636 A | 1/2000 | Reeder | |
| 6,098,053 A | 8/2000 | Slater | |
| 6,327,578 B1 * | 12/2001 | Linehan | 705/65 |
| 6,327,636 B1 | 12/2001 | Guthrie et al. | |
| 6,554,183 B1 * | 4/2003 | Sticha et al. | 235/379 |
| 7,103,575 B1 * | 9/2006 | Linehan | 705/64 |
| 7,210,620 B2 * | 5/2007 | Jones | 235/380 |
| 7,321,864 B1 * | 1/2008 | Gendler | 705/7 |
| 7,340,600 B1 * | 3/2008 | Corella | 713/155 |
| 2002/0077978 A1 | 6/2002 | O'Leary et al. | |
| 2002/0123972 A1 | 9/2002 | Hodgson et al. | |
| 2003/0009382 A1 | 1/2003 | D'Arbeloff et al. | |
| 2003/0018579 A1 | 1/2003 | Litster et al. | |
| 2003/0028481 A1 * | 2/2003 | Flitcroft et al. | 705/39 |

(Continued)

FOREIGN PATENT DOCUMENTS

NZ 265896 7/1996

(Continued)

*Primary Examiner* — Daniel St. Cyr
(74) *Attorney, Agent, or Firm* — TraskBritt

(57) ABSTRACT

A system for the authentication by a card-issuing financial institution of identifying information of a card-holding user of a public data network. The system includes a secure data entry device connected to the public data network and a gateway device connected to the public data network and to a private data network used for transmitting messages between financial institutions. The secure data entry device enables the user to enter identifying information of a card issued by the card-issuing financial institution, and transmits the identifying information in a secure manner over the public data network to the gateway device. The gateway device transmits the identifying information to the card-issuing financial institution and receives an approval response from the card-issuing financial institution over the private data network. The approval response provides authentication of the identifying information by the card-issuing financial institution.

45 Claims, 5 Drawing Sheets

Point of Pay diagrammatical overview.

U.S. PATENT DOCUMENTS

| | | |
|---|---|---|
| 2003/0097343 A1 | 5/2003 | Pinizzotto |
| 2003/0140004 A1 | 7/2003 | O'Leary et al. |
| 2003/0154139 A1 | 8/2003 | Woo |
| 2003/0195842 A1 | 10/2003 | Reece |

FOREIGN PATENT DOCUMENTS

| | | |
|---|---|---|
| WO | 00/67219 A1 | 11/2000 |
| WO | WO 00/67219 A1 | 11/2000 |
| WO | 2005/052801 A1 | 6/2005 |

* cited by examiner

Figure 1: Illustrative drawing of the Point of Pay Device

Figure 2: Logical block diagram of the Point of Pay Device

Figure 4      Point of Pay diagrammatical overview.

SECURE PAYMENT SYSTEM

FIELD OF THE INVENTION

The invention relates to the authentication of users for the purpose of conducting, e.g. financial transactions, and more specifically to a system, method and apparatus by which transactions between two physically separate parties connected over a public data network such as the Internet can be secured.

BACKGROUND OF THE INVENTION

The systems to secure payments over the Internet have been improved since their inception in the mid 1990's to the point where directly related credit card fraud has achieved parity with that of other Cardholder Not Present (CNP) transactions. However, lack of understanding of these methods combined with a disparate media focus on the few cases of fraud that do occur have resulted in a consistently low level of consumer confidence.

Attempts to increase the customer's perception of security, by guaranteeing re-imbursement for contested CNP transactions, has merely exacerbated the problem from the other direction. Many of the smaller online merchants have withdrawn acceptance of credit card transactions because they are unable to support the repeated non-payment of goods that is associated with customers who contest transactions, either genuinely or fraudulently.

The problems that exist are systematic of the methods and conventions by which payments over the Internet are processed. The customer is required to provide to the merchant all of the relevant details of their payment card—such as Primary Account Number (PAN), expiry date, etc—which enables the merchant to then charge the fee to this card. The mechanics of this payment involve the merchant sending a payment request that includes the customer's payment details to the financial institution that holds their bank account, or to a financial service provider who facilitates the connection between merchants and their financial institutions. The merchant's financial institution, referred to as the Acquiring bank, then sends an authorization message to the financial institution that issued the payment card, the details of which were provided by the customer. This message is sent through an inter-bank network, usually maintained by a third party such as a large payment card authority such as MasterCard, VISA or other provider. The financial institution that issued the payment card is identified by the first 6 digits of the payment card number, known as the Bank Issuer Number (BIN).

However, there is no way to ensure that the details provided to the merchant by the customer genuinely belong to that customer, and have not been fraudulently obtained. It is this inability to confirm the presence of the actual owner of the card that leads to such a high percentage of 'charge backs', or transactions where the customer denies taking part in the transaction. Traditionally, if the customer challenges a transaction and the merchant is unable to present proof of their authorization—such as a signature—the money is refunded to the customer, and the merchant must cover the loss.

Customers are also disenfranchised from utilizing Internet payment options because of fear of the theft of their card details. This theft can occur during the transaction itself, or may occur after the fact due to an insecurity of the merchant's web store. Many merchants maintain a database of customer card details, ostensibly to streamline repeat purchases for the consumer, and these databases become attractive targets to the criminal fraternity. Indeed, it is this persistence of the customer's sensitive information that frightens many consumers the most. Although transactions that result from such a 'stolen card' may be 'charged back' to the merchant, the inconvenience of doing so, coupled with the burden of obtaining a new card, is enough to discourage many consumers.

Systems and methods such as those disclosed in U.S. Pat. No. 6,098,053, U.S. 2002/0123972A1, U.S. 2003/0140004A1, U.S. 2002/0077978A1, and U.S. 2003/0154139A1 have attempted to provide a solution to this problem by integrating traditional EFTPOS functionality into the Internet payment arena. In these documents methods are taught that involve the use of an EFTPOS device that is held and maintained by the customer for the purposes of making a secure payment to the merchant without fear of fraud. As the customer's payment details are not passed to the merchant, or passed to the merchant only in encrypted form, there is no risk that they will be compromised, at any stage. However, these systems require fundamental changes to the interaction between customer, merchant, and the banking institutions. The merchant is required to change their 'web store' purchase systems, and the relationship between the merchant and its Acquirer is removed from the transaction. However, without the support of the merchants, there is no incentive for the customer to participate in the system, indeed with no merchant support there is no system for the customer to take part in. Conversely, there is no incentive for the merchant to alter their payment systems without a large customer base able to utilize these changes. Therefore any such revolutionary system faces a fundamental challenge to gain momentum in a market dominated by an alternative paradigm, and this problem has prevented the uptake of these systems.

Alternatively, other systems provide the customer with a single use PAN, which can only be used for one transaction. This removes the risk associated with the theft of the customer's details, as they are not useful outside the context of a single transaction that the customer has already performed. This system has merits, but can be seen to protect only the customer in the transaction, while proving no benefit to the merchant. As indicated above, the high level of 'charge backs' generated through internet commerce is a key problem in increasing revenues in this field, and any system that does not provide benefit for the merchant faces a high barrier to entry in the market. These systems also suffer from the requirement that the card Issuer must alter their host systems to correctly identify and interpret the substituted PAN as belonging to the customer who initiated the transaction. Alterations to these banking systems are costly and time-consuming due the high quality assurance and certification requirements that must be met. Additionally, these systems are incompatible with some merchant purchase software (such as the 'one click' systems) where the customer is expected to use a single card number for many transactions. Finally, the customer is limited to using only cards that provide this replacement PAN facility for any transaction that they perform on the internet. This limits the purchase and payment choices of the consumer, therefore reducing the appeal of Internet commerce to them.

A similar system is disclosed in US patent application no. 2003/0195842A1, however the system described therein is further limited in its application by necessitating the use of stored value payment cards by the customer.

Another method for securing of Internet transactions is taught by US patent application no. US2003/0097343A1. This system requires an intermediary party, referred to as a processing centre, to act as a conduit through which the transaction is conducted. Customer security is provided by reducing the exposure of customers' payment details to a single trusted party, rather than a plurality of merchants. However, this system similarly suffers from the requirement for a system wide paradigm shift in the method by which Internet payments are made.

U.S. Pat. No. 5,809,143 teaches the use of a secure keyboard for Internet commerce transactions. This system provides secure entry of card holder information, such as account number and PIN. However, the mechanisms for interaction with the merchant are altered once again. Additionally, the requirement for a secondary communications means limits the application of this system in the present environment.

Accordingly, there is a need for a system that can provide benefit to all involved parties—customer, merchant, and financial institutions—and that can be deployed and applied immediately with no impact any party other than the customer who uses the system.

It is therefore an object of the present invention to provide a method and system for authenticating identifying information, such as account number and PIN, provided by a user of a public data network, such as the Internet, that mitigates the aforementioned problems of the prior art.

Any discussion of documents, devices, acts or knowledge in this specification is included to explain the context of the invention. It should not be taken as an admission that any of the material formed part of the prior art base or the common general knowledge in the relevant art on or before the priority date of the claims herein.

SUMMARY OF THE INVENTION

In one aspect the present invention provides a system for the authentication by a card-issuing financial institution of identifying information of a card-holding user of a public data network, including:

a secure data entry device connected to the public data network; and a gateway device connected to the public data network and to a private data network used for transmitting messages between financial institutions;

wherein the secure data entry device includes means for the user to enter identifying information of a card issued by the card issuing financial institution, and means for transmitting the identifying information in a secure manner over the public data network to the gateway device; and wherein the gateway device includes means for transmitting the identifying information to the card-issuing financial institution and for receiving an approval response from the card-issuing financial institution over the private data network;

whereby the approval response provides authentication of the identifying information by the card-issuing financial institution.

Accordingly, the system enables the identifying information of a card holder located at a point of purchase remote from any point of sale to be verified by the card-issuing financial institution in a secure manner over a public data network.

Preferably, the public data network is the Internet. The secure data entry device may be connected to the public data network via the user's personal computer.

The private data network may be an inter-bank network used for the transferral of electronic transaction data. The private data network may be provided via a dedicated network operated for the sole purpose of conducting such electronic transactions. Alternatively, the private data network may be a virtual private network provided via a host public data network. The host public data network may be the Internet.

The secure data entry device preferably includes a card reader for reading relevant information stored on the user's card. The card reader may be able to read ISO 7816 'smart card' or ISO 7811 'mag stripe' type cards, and is preferably able to read both types of cards.

Preferably, the secure data entry device also includes a keypad to enable the user to enter data into the system. Data entered by the user may include a Personal Identification number associated with the card.

The identifying information preferably includes one or more of: the Primary Account Number associated with the card; the expiry date of the card; and the user's Personal Identification Number associated with the card. Advantageously, by enabling the user to provide this information for authentication in a secure manner at a point of purchase that may be remote from any point of sale, the system is able to confirm the presence of the of the actual owner of the card at the point of purchase.

The identifying information may be transmitted using a standard transaction message format compliant to ISO 8583. Preferably the ISO 8583 message used is one of: an '0200' financial presentment message; and an '0104' authorisation message.

The gateway device preferably also includes means for transmitting the approval response to the secure data entry device. In a preferred embodiment, the secure data entry device further includes means for deriving from the approval response verifiable proof that the customer's identifying information has been authenticated by the card-issuing financial institution. The proof may be an authentication data block, consisting of data computed in a secure manner from the approval sent from the card-issuing bank. The data block may be a whole or truncated encryption of the approval message derived using an encryption key stored securely within the secure data entry device.

Advantageously, the system thus enables the secure data entry device to derive verifiable proof of the presence of the actual owner of the card at the point of purchase that may be used in subsequent transactions with other devices having the ability to verify the proof.

In a particularly preferred embodiment, the gateway device also includes means to generate a replacement card number upon receipt of the approval response from the card-issuing institution. The replacement card number may be transmitted to the secure data entry device over the public data network. The replacement card number may then be used in a subsequent payment transaction conducted over the public data network. Advantageously, in accordance with the invention actual card details are never transmitted over the network in an insecure manner, or provided to a merchant or other online operator, thus providing for greater security of card details and enhanced consumer confidence in the system.

The replacement card number may be generated dynamically for use in a single transaction. Alternatively, the replacement card number may be maintained and used for multiple transactions.

Supplementary details of a transaction, including one or more of the transaction amount and a merchant identification, may also be transmitted to the gateway device by the secure data entry device. Preferably, said supplementary details are transmitted to the gateway device in the transaction message carrying the identifying information.

In a particularly preferred embodiment the Bank Identification Number of the replacement card number may be selected such that the payment transaction is routed through the gateway device on the private data network before being sent to the card-issuing financial institution. Alternatively, the Bank Identification Number of the replacement card number may be selected such that the payment transaction is directed over the private data network to the gateway device by identifying the gateway device as a card-issuing institution of the replacement card number.

Preferably, the gateway device further includes means for receiving payment transaction messages from the private data network, means for modifying received payment transaction messages, and means for transmitting said modified payment transaction messages to the card-issuing financial institution, whereby the gateway device is able to substitute actual card numbers for replacement card numbers before transmitting received payment transaction messages to the card-issuing financial institution.

In a particularly preferred embodiment, the gateway device further includes a database of replacement card numbers including corresponding actual card numbers and supplementary transaction details.

In another aspect, the invention provides a method for the authentication by a card-issuing financial institution of identifying information of a card-holding user of a public data network, including the steps of:

providing a secure data entry device connected to the public data network;

providing a gateway device connected to the public data network and to a private data network used for transmitting messages between financial institutions;

the user entering identifying information of a card issued by the card issuing financial institution into the secure data entry device;

transmitting the identifying information in a secure manner over the public data network to the gateway device;

transmitting the identifying information to the card-issuing financial institution; and receiving an approval response from the card-issuing financial institution over the private data network;

whereby the approval response provides authentication of the identifying information by the card-issuing financial institution.

In yet another aspect, the invention provides a secure data entry apparatus for use in a system for the authentication by a card-issuing financial institution of identifying information of a card-holding user of a public data network including:

an interface for connection to a public data network;

means for the user to enter identifying information of a card issued by the financial institution;

means for transmitting the identifying information in a secure manner over the public data network to a gateway device that includes means for transmitting the identifying information to the card-issuing financial institution and for receiving an approval response from the card-issuing financial institution over the private data network;

whereby the approval response provides authentication of the identifying information by the card-issuing financial institution.

The invention further provides a process for the authentication, by a card-issuing financial institution, of identifying information of a card-holding user of a public data network, the process including the following steps:

providing a secure data entry device connected to the public data network; and providing a gateway device connected to the public data network and to a private data network used for transmitting messages between financial institutions;

transmitting the identifying information in a secure manner over the public data network to the gateway device;

transmitting the identifying information to the card-issuing financial institution; and receiving an approval response from the card-issuing financial institution over the private data network;

whereby the approval response provides authentication of the identifying information by the card-issuing financial institution.

BRIEF DESCRIPTION OF THE DRAWINGS

Further benefits and advantages of the present invention will become apparent in the following description of preferred embodiments of the invention, which should not, however, be considered to limit the scope of the invention or any of the preceding statements. Preferred embodiments are described with reference to the accompanying drawings in which.

DESCRIPTION OF PREFERRED EMBODIMENT

Figure 1:
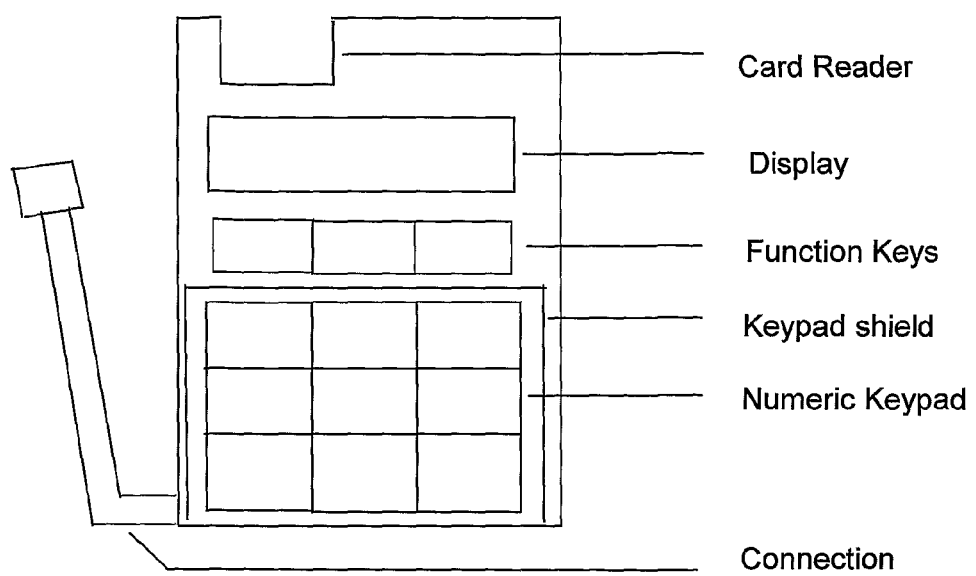
FIG. 1 illustrates an embodiment of a secure customer data entry device in accordance with the present invention.
Figure 2:
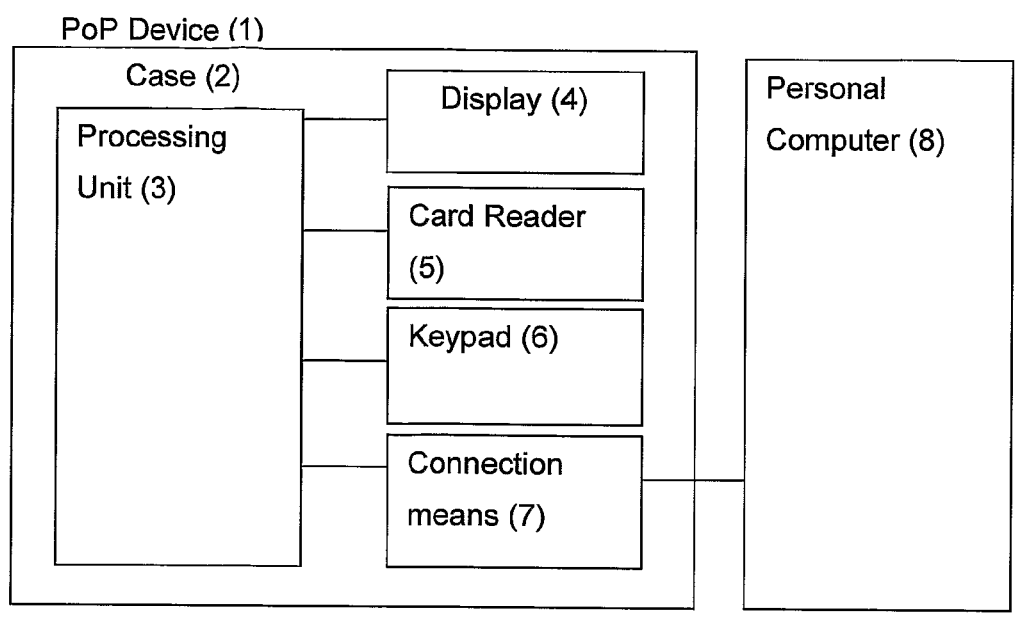
FIG. 2 shows the secure data entry device of FIG. 1 in the form of a functional block diagram.

FIG. 1 provides an illustration of an embodiment of a secure data entry device, also referred to herein as a Point of Payment, or PoP, device. FIG. 2 represents this device as a logical block diagram of its composite parts.

The PoP device 1 is a low cost secure product that includes a processing unit 3, a card reader 5, a keypad 6, a display 4, and an interface 7 providing for the transmission of data and power between the device and a Personal Computer 8. The interface 7 may be, for example, a standard peripheral interface such as a USB connection.

The PoP device 1 is capable of securely obtaining payment information from a customer, such as payment card details and Personal Identification Number (PIN), and encrypting these details for their secure transport to a remote device. In the preferred embodiment, the encryption and message formats used by the PoP device comply to ISO 8583.

The processing unit 3 is an assembly of electronics that provides the control and electronic storage requirements of the device, such as controlling the keypad, display, and card reader, and providing for the secure storage of encryption keys. In the preferred embodiment, the processing unit 3 is a single integrated circuit, but it may consist of an assembly of physically separate integrated circuits or other electronic parts such as transistors and logic gates.

The card reader 5 is used to obtain the relevant identification information from a customer's payment card, and may be constructed to support cards with embedded electronics such as those that conform to the ISO 7816 'smart card' standard or cards that possess only a magnetic stripe on one or both of their faces to hold information such as ISO 7811 compliant 'mag stripe' cards. In the preferred embodiment, the card reader 5 supports both said 'smart card' and said 'mag stripe' card types.

The keypad 6 is used for user interaction with the system. It consists of a number of keys that allow the user to perform actions including the entry of numeric digits, and the acceptance or cancellation of entries. The keypad 6 may also support character based input, and is constructed and scanned in a manner that ensures the security and integrity of the user input. The keypad 6 may also support the use of additional 'function' keys whose function is dictated by the status and operation of the software application being executed by the processing device 3.

The display 4 provides information to the user on the status of the device and its function. In the preferred embodiment, the display consists of a Liquid Crystal Display, which is capable of displaying at least 2 rows of 8 characters.

All of the components of the PoP device 1 are enclosed within a casing 2, preferably made from an inexpensive plastic alloy. Security measures such as tamper evidence, tamper detection, and tamper response are integrated into the device and casing to prevent unauthorised access to the components, such as the keypad or processing device. Such security measures are requirements of the financial institutions to which the PoP device must connect and are essential for the device to accept the PINs that are associated with customer cards. Said PINs are used in the authentication of the card holder during the transaction.

Figure 3:
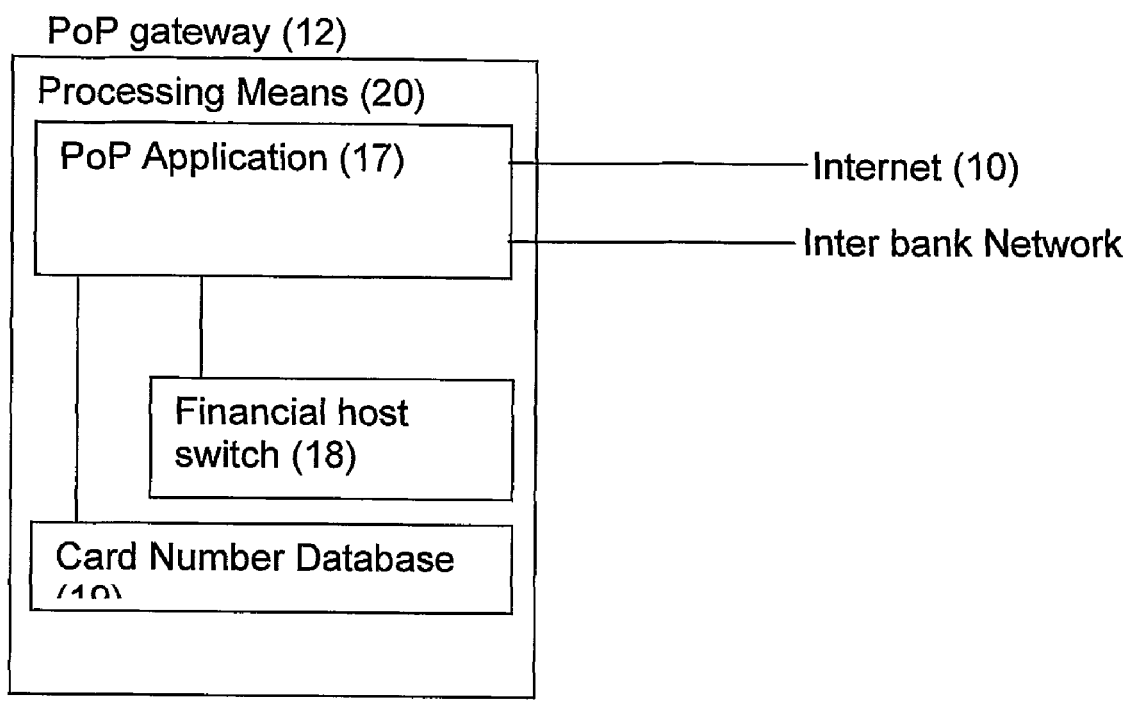
FIG. 3 is a block diagram of an embodiment of a gateway device in accordance with the present invention.

FIG. 3 shows a logical block diagram of a gateway device 12, also referred to herein as a PoP gateway, which is connected to both the Internet 10 and a private data network 15 used for transmitting messages, such as transaction messages, between financial institutions. The network 15 is also referred to herein as an Inter-Bank Network. The gateway includes processing means 20, such as a microprocessor and associated memory and other peripheral hardware, which executes a PoP application 17 that controls the operation of the PoP gateway 12 and interfaces to a financial host switch 18 and a card number database 19.

The processing means 20 could be any system that allows for the execution of programmed commands, such as a personal, industrial, or mainframe computer. Alternatively, the processing means 20 could be a single Integrated Circuit, or combination of many physically separate Integrated Circuits or logic gates.

The financial host switch 18 is an application that is designed to provide for the transmission and receipt of messages with a financial institution, including but not limited to those messages defined by the international financial interchange standard ISO 8583.

The card number database 19 is a database of 'virtual' card numbers that have been assigned to card holders for use with one or more transactions.

Figure 4:
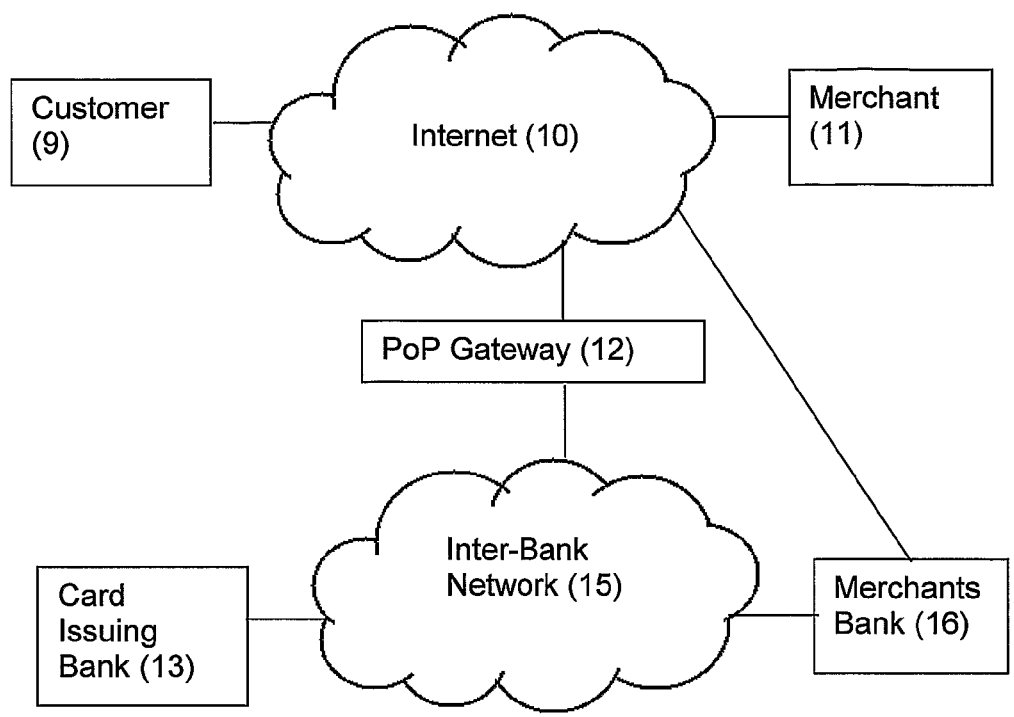
FIG. 4 illustrates a system for conducting a secure transaction between a customer and a merchant in accordance with a preferred embodiment the present invention.

FIG. 4 is a block diagram of a complete transaction system, according to a presently preferred embodiment of the invention, that illustrates the different parties that are potentially involved in a transaction, and the connections between them. In summary, the system includes a customer 9 having a secure data entry device (PoP device) connected to the Internet 10. As described above, this connection may be provided via the customer's Personal Computer (PC). The system also includes a merchant 11, having a virtual store that can be accessed via the Internet 11, and an acquiring financial institution 16 which holds the banking account of the merchant (Merchant Acquirer). The system further includes a card-issuing financial institution 13 (Card Issuer) that holds a banking account of the customer; and a gateway device 12 (PoP Gateway).

In the presently preferred embodiment, the customer 9 is the initiator and payer of a transaction and possesses a PoP device 1 which is connected to a personal computer 8 which is connected to the Internet 10. The customer also possesses a payment card and associated PIN.

The merchant 11 is the recipient and payee of a transaction. The merchant possesses an Internet site that utilises a standard payment system for the processing of Internet transactions and this system is connected through the Internet 10 to the merchant's bank 16 either directly or through a payment service provider that facilitates Internet commerce by connecting merchants and financial institutions.

The merchant's bank 16, also known as the Acquiring Bank, is the institution that holds that merchant's bank account and is connected to the merchant via the Internet 10, either directly or indirectly, and an inter-bank network 15 used for the transferral of electronic transaction data. Examples of such networks are Bank Net which is maintained by MasterCard, and VISA Net which is maintained by VISA. These networks are the standard method for the transferral of transactions between physically separate financial institutions, and as used by the present Internet commerce systems to issue authorisation and funds transfer requests.

The Card Issuing bank 13 is the financial institution that issued the payment card to the customer and is also connected to the inter-bank network 15.

The PoP gateway 12 is connected to both the Internet 10 and the inter-bank network 15 and is involved in both the initial EFTPOS transaction that is used to confirm the identity and funds of the customer 9, and the standard authorisation/funds transfer messages that are sent from the merchant 11 via the merchant's Acquiring Bank 16. Multiple payment gateways may exist at any one time to prevent congestion or possible attacks, such as a 'denial of service' attack, from rendering the system inoperable. It is also possible that any arbitrary PoP device may be required to connect to a specific PoP gateway due to the geographical location or contractual arrangements of said PoP device. Additionally, the PoP gateway need not be a physically separate entity, but may in fact be integrated into the inter bank network or deployed and maintained by the card Issuing bank 13 as a part of its financial host system.

Figure 5:
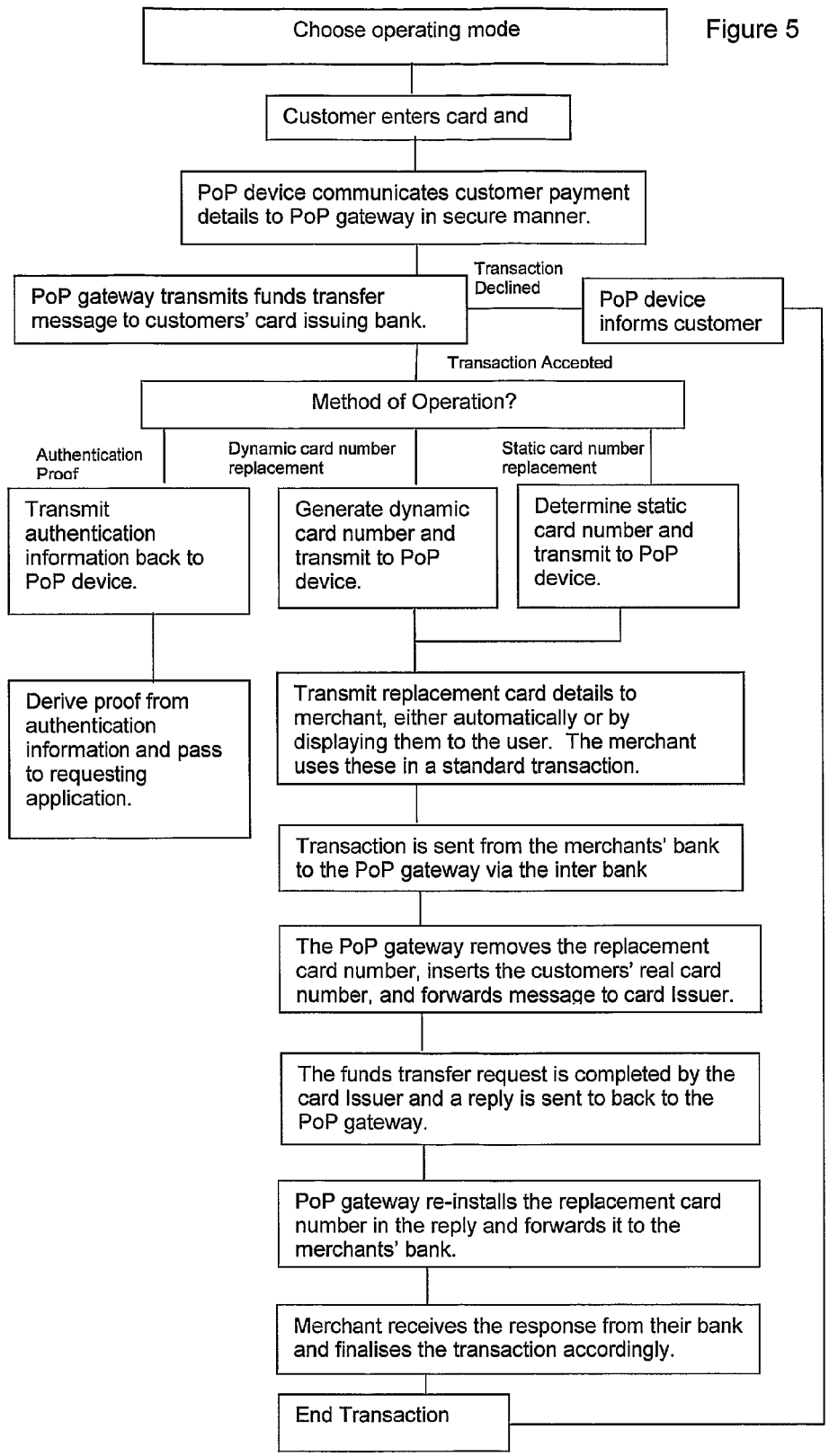
FIG. 5 is a flow diagram illustrating the steps that may be carried out in the course of a transaction within the system of FIG. 4.

FIG. 5 provides a flow diagram 500 of the operation of the preferred embodiment of the invention. The diagram 500 illustrates that the system may be used to obtain authentication of customer related financial details for the purposes of:

transferring proof of authentication to another party;

obtaining a replacement card number that may be used in conjunction with the invention for subsequent remote purchases; or obtaining a replacement card number that may be used in conjunction with the invention for a purchase currently in progress.

In order to perform one of the three operations outlined above, the appropriate operating mode is first selected 502. The operating mode is one of: authentication proof; dynamic card number replacement; or static card number replacement. The desired mode of operation may be selected through customer interaction, or automatically by the customers Personal Computer, or the processing means of the PoP device.

In the next step 504 in all modes of operation, the customer enters their card-identifying information by entering their payment card and PIN into the PoP device.

To obtain authentication of the customer's identifying information, in the next step 506 the PoP device communicates the information to the PoP gateway. In particular, the PoP device 1 provides for the secure transmission of the 'customers' payment details to the PoP gateway 12 over the Internet 10. Preferably, this security is provided via the encryption of the information, using an encryption scheme and encryption key maintained within the secure housing of said PoP device 1 such that the customer's payment details are not available to any party or device external to the PoP device in an unencrypted form. In the preferred embodiment, the encryption and message format used to communicate to said PoP gateway conform to ISO 8583, and specifically the payment details are formatted as a '0200' purchase or '0104' authorisation transaction. An indication in this message is supplied by the PoP device to inform the PoP gateway of the selected mode of operation for the present transaction.

In the subsequent step 508, the PoP gateway 12 decrypts and forwards this transaction to the card Issuing bank 13. This may involve the PoP gateway re-encrypting and/or re-formatting the message for transmission to the card Issuing bank 13. If the card-issuing bank does not indicate approval of the payment details (e.g. due to incorrect PIN supplied by the customer), then an indication that the transaction has been declined is returned to the PoP device, which informs 510 the customer of the failure.

However, if the payment details are approved by the card-issuing bank, then further steps are carried out by, the precise operations being selected 512 on the basis of the chosen mode of operation.

In the Authentication Proof mode of operation, the PoP gateway transfers 514 the approval from the card-issuing bank to the PoP device. The PoP device then uses this approval to derive 516 verifiable proof that the customer's identifying information has been authenticated. The proof will typically take the form of an authentication data block, consisting of data that may be derived in a secure manner from the approval sent from the card-issuing bank. An authentication data block may be, for example, generated in the form of a secure digest of the approval message, such as a whole or truncated encryption of the approval message. Such encryption may be performed using a secret key stored securely within the PoP device.

The approval message in combination with the authentication data block may subsequently be used as proof of authorisation by the card-issuing bank. A receiving device is able to verify the proof by confirming that an approval message and authentication block provided to it by the PoP device are valid. If a symmetric encryption system is used to generate the authentication data block, then the receiving device requires the same secret key for verification as was used by the PoP device in generating the data block. Such secret keys may be distributed to those secure and trusted devices requiring them via any one of a number of secure key distribution methods known in the art. Alternatively, an asymmetric encryption system may be used, in which case the PoP device uses a private key to generate the authentication data block and the receiving device is able to verify the proof using the corresponding public key, which does not need to be stored or distributed in a secure manner.

In the Static Card Number Replacement mode of operation, the system is used to issue the customer with a static replacement card number which enables the PoP device to be used with merchants that utilise a payment system that stores customers payment details for use in subsequent transactions. The 'one click' payment system is an example of such a system. Preferably, the PoP gateway stores this static replacement card number, thus allowing the same replacement card number to be provided for a particular payment card irrespective of the particular PoP device used. Alternatively, the PoP device may store the static replacement card number.

In the Static Card Number Replacement mode, once approval has been indicated in the reply from the card-issuing bank, the PoP gateway 12 establishes 534 with the PoP device 1 a static replacement card number. Preferably, the first six digits of the replacement card number, known as the Bank Identification Number, are set to a specific value that indicates that the card number was issued by the PoP gateway 12. This allows a transaction from any merchant's bank 16 to be routed through said PoP gateway 12 during its transit through the inter-bank network 15 to the card Issuing bank 14. Preferably, the Bank Identification Number used in the replacement card number indicates that the card is issued by the customers Issuing Bank 13, but that the transaction must be routed through the PoP gateway 12 before reaching the Issuing Bank 13. Such specific routing can be indicated in fields 33 and 100 of an ISO 8583 transaction message, the values of these fields being set according to the card BIN. The remaining digits of the replacement card number could be the original Primary Account Number encrypted by either the PoP device 1 or the gateway 12, a card number randomly generated by the gateway, or a card number chosen from a list contained within the card number database 19. If an encrypted version of the original customer payment card number is used, some modification of this encrypted value may be necessary to ensure the replacement card number complies to any required payment card standards.

The static replacement card number is then transferred to the user via the PoP device 1, and may be stored in the device 1, or in the card number database 19 of the PoP gateway 12.

To complete a subsequent purchase, the customer 9 provides the merchant 11 with the static replacement card number in place of their actual card number, and the transaction is completed in accordance with the steps 520-532 as described in greater detail in the following discussion of the Dynamic Card Replacement mode of operation.

In the Dynamic Card Replacement mode of operation, the system is used to issue the customer with a replacement payment card number that may be used in a transaction currently in progress across the Internet. The customer 9 selects goods/services from merchant 11 web site and proceeds to the payment 'page' in the normal manner, where they are presented with the merchant's 11 payment information form.

In the Dynamic Card Number Replacement mode, once approval has been indicated in the reply from the card-Issuing bank, the PoP gateway 12 checks if the payment card has a static replacement card number assigned to it, and will use this if it exists. If not, the PoP gateway 12 establishes 518 with the PoP device 1 a replacement card number which will apply for the remainder of the transaction with the merchant. The Bank Identification Number may need to be set to a specific value that indicates that the card number was issued by the PoP gateway 12 to allow the transaction from the merchant's bank 16 to be routed through the PoP gateway 12 during its transit through the inter bank network 15 to the card Issuing bank 14. Preferably, the Bank Identification Number used for the replacement card number indicates that the card is issued by the customer's Issuing Bank 13, but that the transaction must be routed through the PoP gateway 12 before reaching the Issuing bank 13. Such specific routing can be indicated in fields 33 and 100 of an ISO 8583 transaction message, the values of these fields being set according to the card BIN. The remaining digits of the replacement card number could be the original Primary Account Number encrypted by the PoP device 1 or the gateway 12, a card number randomly generated by the gateway 12, or a card number chosen from a list contained within the card number database 19. If an encrypted version of the original customer payment card number is used, some modification of this encrypted value may be necessary to ensure the replacement card number complies to any required payment card standards.

Preferably the PoP gateway 12 also obtains information relating to the cost of the transaction and identification of the merchant, with respect to the purchase underway.

The PoP gateway 12 then stores the replacement card number, and the original card number, and any additional information obtained relating to the transaction in process, in the card number database 19 for use later in the transaction. Alternatively, these details could be transmitted to the PoP gateway 12 in special fields of the transaction message, removing the requirement for the card number database. Preferably, the PoP gateway 12 supports both of these methods.

The PoP device 1 then notifies the PoP application software resident on the customer's Personal Computer that a replacement card number has been obtained. This replacement card number is then transferred 520 to the merchant's Internet payment page, either through the agency of the PoP PC application automatically determining the location of the card number field, or by displaying the card number on the display 4 of the PoP device 1 for the customer 9 to transcribe into the appropriate section of the page.

The merchant 11 then proceeds with the transaction using their standard payment system, as used with any normal transaction. For example, the merchant may have their own payment processing system that is used, they may transfer the payment request to a payment service provider, or they may communicate directly to the financial institution that maintains the merchant's banking account. Regardless of the embodiment of this payment system, a funds transfer request will ultimately be issued to the merchant's Bank 16.

The merchant's Bank 16 will then forward 522 a funds transfer message to the financial institution that is indicated by the BIN of the replacement card number supplied by customer 9 via the inter bank network 15. In the preferred embodiment of the invention, this is the 'customers' card-issuing bank 13, however this may also be the PoP gateway 12. Preferably this message will take the form of an ISO 8583 authorisation request '0100' message, financial presentment request '0200' message, or financial presentment advice '0220' message. The type, format, and number of messages that are sent to said customer card issuing bank depends on the transaction amount and the policies of the merchant's bank 16. Multiple messages may be sent, for example the merchant's bank 16 may send an authorisation request message to verify the customer's ability to pay for the purchase before the transaction is finalised with the customer, and then send a financial presentment request when the transaction is finalised.

In the preferred embodiment of the invention the funds transfer messages are sent to the customer's card issuing bank 13 via the PoP gateway 12. This routing is determined by the BIN of the replacement card number supplied by the customer 9. In the next step 524 of the transaction, at the PoP gateway the PoP application 17 identifies the replacement card number in its card number database 19 and then re-instates the customers' original card number. Any supplementary details supplied during the initial authorisation transaction, such as the payment amount and merchant details, are also checked at this stage and the transaction is rejected if these values to not match those held in the card number database 19. If all supplied supplementary details are found to be correct, the message is prepared for transmission to the customers' card issuing bank 13. If the PoP gateway 12 is logically remote to the customers' card issuing bank, the PoP application also alters the message to ensure that the response to the message is routed back through the PoP gateway 12 on its way to the merchant's bank 16. In an ISO 8583 message this can be achieved by altering the Acquirer field in the message.

In the subsequent step 526, the customer's card issuing bank 13 receives the financial message from the PoP gateway 12, and processes it in the normal manner. The response is sent back to the PoP gateway 12 as dictated by the alterations to the original message performed by the PoP application prior to its transmission to said customer bank. In a step 528 performed at the PoP gateway 12, the customer's card number is once again substituted with the replacement card number and the response is forwarded it to the Acquirer, i.e. the merchant's bank 16. This may require the PoP application to keep a record of forwarded financial messages to enable it to re-transmit the response back to the correct financial institution.

Upon receipt of all the transaction message responses sent from the customer card issuing bank 13 via the PoP gateway 12, the merchant bank 16 finalises 530 the transaction. The goods or services requested by the customer are fully paid for, and the transaction is completed 532.

From the foregoing description, it will be readily apparent to those skilled in the art that many variations of the secure payment system and method are possible in accordance with the invention, which is not to be limited to the embodiments described. A number of combinations of features have been described with reference to specific embodiments of the invention, or component parts thereof, however it will be apparent to the skilled person that these various features may be combined in other ways while still falling within the scope of the invention as defined by the appended claims.

In particular, it will be apparent to a skilled person that many modifications may be made to the PoP device 1, including the integration of the device into a computer keyboard, mobile phone, pointing device, or other such computer peripheral, without departing from the spirit and scope of the invention. Furthermore, the PoP gateway 12 need not be a stand-alone device, and may be integrated into a PoP Issuing financial institution (PoP Issuer) or the inter-bank network.

In other variations, additional support for the secure payment system may be provided by the merchant's web site. For example, rather than the customer 9 being required to enter their card and PIN into the PoP device 1 in order to activate the PoP software, special fields contained within the payment page, such as HTML tags that are not displayed to the customer 9 may cause software installed onto the Personal Computer 8 to activate the PoP device 1 which will then prompt the customer 1 to enter their payment card and details. Such special fields could also be used by the PoP software to convey the customers' payment information and shipping details to the merchant.

It will therefore be understood that the invention could take many forms and be put to many different uses. All such forms and uses are embodied within the spirit and scope of the invention, which is to be understood as not being limited to the particular constructional details of the embodiments discussed above, but which extends to each novel feature and combination of features disclosed in or evident from this specification and the accompanying drawings. All of these different combinations constitute various alternative aspects of the invention.

It will also be understood that the term "comprises" (or its grammatical variants) as used in this specification is equivalent to the term "includes" and should not be taken as excluding the presence of other elements or features. Further, wherever used in this specification, the term "includes" is not a term of limitation, and is not be taken as excluding the presence of other elements or features.

The invention claimed is:

1. A system for the authentication by a card-issuing financial institution of identifying information of a card-holding user of a public data network, the system comprising:
   a secure data entry device connected to the public data network; and
   a gateway device connected to the public data network and to a private data network used for transmitting messages between financial institutions;
   wherein the secure data entry device comprises means for the user to enter identifying information of a card issued by the financial institution, means for the user to enter the user's Personal Identification Number ("PIN"), means for encrypting the identifying information and PIN for secures transmission, and means for transmitting the encrypted identifying information and PIN in a secure manner via the data transmission output over the public data network to the gateway device; and
   wherein the gateway device includes means for transmitting the identifying information to the card-issuing financial institution and for receiving an approval response from the card-issuing financial institution over the private data network; and
   whereby the approval response provides authentication of the identifying information by the card-issuing financial institution;
   wherein the gateway device further includes means to generate a replacement card number upon receipt of the approval response from the card-issuing institution and wherein the Bank Identification Number of the replacement card number is selected such that the payment transaction is routed through the gateway device on the private data network before being sent to the card-issuing financial institution.

2. The system of claim 1 wherein the public data network is the Internet.

3. The system of claim 1 wherein the secure data entry device is connected to the public data network via a personal computer.

4. The system of claim 1 wherein the private data network is an inter-bank network used for the transferral of electronic transaction data.

5. The system of claim 4 wherein the private data network is provided via a dedicated network operated for the sole purpose of conducting electronic financial transactions.

6. The system of claim 4 wherein the private data network is a virtual private network operated for the purpose of conducting electronic financial transactions via a host of public data network.

7. The system of claim 1 wherein the secure data entry device further includes: a card reader for reading relevant information stored on the user's card; and a keypad to enable the user to enter data into the system.

8. The system of claim 7 wherein the card reader is able to read one or both of ISO 7816 'smart card' or ISO 7811 'mag stripe' type cards.

9. The system of claim 1 wherein said identifying information includes one or more of:
   the Primary Account Number associated with the card;
   the expiry date of the card; and
   the user's Personal Identification Number associated with the card.

10. The system of claim 1 wherein the identifying information is transmitted using a standard transaction message format compliant to ISO 8583.

11. The system of claim 10 wherein the ISO 8583 message used is one of an '0200' financial presentment message, and or an '0104' authorization message.

12. The system of claim 1 wherein the gateway device also includes means for transmitting the approval response to the secure data entry device.

13. The system of claim 12 wherein the secure data entry device further includes means for deriving from the approval response verifiable proof that the customer's identifying information has been authenticated by the card-issuing financial institution.

14. The system of claim 13 wherein said proof is an authentication data block, consisting of data computed in a secure manner from the approval sent from the card-issuing bank.

15. The system of claim 14 wherein the data block is a whole or truncated encryption of the approval message derived using an encryption key stored securely within the secure data entry device.

16. The system of claim 1 wherein the replacement card number is transmitted to the secure data entry device over the public data network.

17. The system of claim 1 wherein the replacement card number is generated dynamically for use in a single transaction.

18. The system of claim 1 wherein the replacement card number is maintained and used for multiple transactions.

19. The system of claim 1 wherein supplementary details of a transaction are also transmitted to the gateway device by the secure data entry device, and wherein said supplementary details include one or more of the transaction amount and a merchant identification.

20. The system of claim 19 wherein said supplementary details are transmitted to the gateway device in the transaction message carrying the identifying information.

21. The system of claim 1 wherein the gateway device further includes: means for receiving payment transaction messages from the private data network; means for modifying received payment transaction messages; and means for transmitting said modified payment transaction messages to the card-issuing financial institution; whereby the gateway device is able to substitute actual card numbers for replacement card numbers before transmitting received payment transaction messages to the card-issuing financial institution.

22. The system of claim 1 wherein the gateway device further includes a database of replacement card numbers including corresponding actual card numbers and supplementary transaction details.

23. The system for the authentication by a card-issuing financial institution of identifying information of a card-holding user of a public data network according to claim 1 wherein said secure data entry device comprises a discrete device with a data transmission output connected to the public data network.

24. A system for the authentication by a card-issuing financial institution of identifying information of a card-holding user of a public data network, the system comprising:
   a secure data entry device connected to the public data network; and
   a gateway device connected to the public data network and to a private data network used for transmitting messages between financial institutions;
   wherein the secure data entry device comprises means for the user to enter identifying information of a card issued by the financial institution, means for the user to enter the user's Personal Identification Number ("PIN"), means for encrypting the identifying information and PIN for secures transmission, and means for transmitting the encrypted identifying information and PIN in a secure manner via the data transmission output over the public data network to the gateway device; and wherein the gateway device includes means for transmitting the identifying information to the card-issuing financial institution and for receiving an approval response from the card-issuing financial institution over the private data network;

whereby the approval response provides authentication of the identifying information by the card-issuing financial institution;

wherein the gateway device further includes means to generate a replacement card number upon receipt of the approval response from the card-issuing institution and wherein the Bank Identification Number of the replacement card number is selected such that the payment transaction is directed over the private data network to the gateway device by identifying the gateway device as a card-issuing institution of the replacement card number.

25. The system for the authentication by a card-issuing financial institution of identifying information of a card-holding user of a public data network according to claim 24 wherein said secure data entry device comprises a discrete device with a data transmission output connected to the public data network.

26. The system of claim 24 wherein the public data network is the Internet.

27. The system of claim 24 wherein the secure data entry device is connected to the public data network via a personal computer.

28. The system of claim 24 wherein the private data network is an inter-bank network used for the transferral of electronic transaction data.

29. The system of claim 27 wherein the private data network is provided via a dedicated network operated for the sole purpose of conducting electronic financial transactions.

30. The system of claim 27 wherein the private data network is a virtual private network operated for the purpose of conducting electronic financial transactions via a host of public data network.

31. The system of claim 24 wherein the secure data entry device further includes: a card reader for reading relevant information stored on the user's card; and a keypad to enable the user to enter data into the system.

32. The system of claim 31 wherein the card reader is able to read one or both of ISO 7816 'smart card' or ISO 7811 'mag stripe' type cards.

33. The system of claim 24 wherein said identifying information includes one or more of:
 the Primary Account Number associated with the card;
 the expiry date of the card; and
 the user's Personal Identification Number associated with the card.

34. The system of claim 24 wherein the identifying information is transmitted using a standard transaction message format compliant to ISO 8583.

35. The system of claim 34 wherein the ISO 8583 message used is one of an '0200' financial presentment message, and or an '0104' authorization message.

36. The system of claim 24 wherein the gateway device also includes means for transmitting the approval response to the secure data entry device.

37. The system of claim 36 wherein the secure data entry device further includes means for deriving from the approval response verifiable proof that the customer's identifying information has been authenticated by the card-issuing financial institution.

38. The system of claim 37 wherein said proof is an authentication data block, consisting of data computed in a secure manner from the approval sent from the card-issuing bank.

39. The system of claim 38 wherein the data block is a whole or truncated encryption of the approval message derived using an encryption key stored securely within the secure data entry device.

40. The system of claim 24 wherein the replacement card number is transmitted to the secure data entry device over the public data network.

41. The system of claim 24 wherein the replacement card number is generated dynamically for use in a single transaction.

42. The system of claim 24 wherein the replacement card number is maintained and used for multiple transactions.

43. The system of claim 24 wherein supplementary details of a transaction are also transmitted to the gateway device by the secure data entry device, and wherein said supplementary details include one or more of the transaction amount and a merchant identification.

44. The system of claim 43 wherein said supplementary details are transmitted to the gateway device in the transaction message carrying the identifying information.

45. The system of claim 24 wherein the Bank Identification Number of the replacement card number is selected such that the payment transaction is routed through the gateway device on the private data network before being sent to the card-issuing financial institution.

* * * * *

UNITED STATES PATENT AND TRADEMARK OFFICE
CERTIFICATE OF CORRECTION

PATENT NO. : 8,074,874 B2
APPLICATION NO. : 10/580663
DATED : December 13, 2011
INVENTOR(S) : Hector Daniel Elbaum, Andrew Jamieson and David McGregor Page 1 of 1

It is certified that error appears in the above-identified patent and that said Letters Patent is hereby corrected as shown below:

On the title page:
In ITEM (73) Assignee: change "Point of Paypty Ltd," to --Point of Pay Pty Ltd,--

In ITEM (22) PCT Filed: change "Nov. 26, 2004" to --May 26, 2004--

In the drawings:
Replace FIG. 3 with the following amended figure:

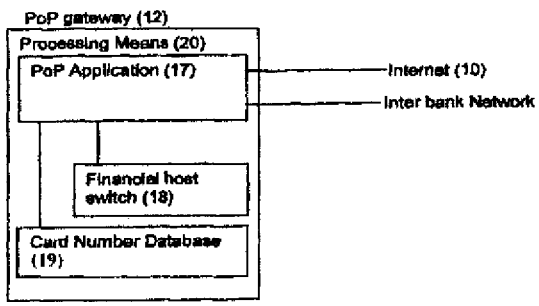

Figure 3

In FIG. 3, directly below the text --Card Number Database-- insert --(19)--

In the claims:
CLAIM 1,   COLUMN 13, LINE 17,   change "for secures" to --for secure--
CLAIM 24,  COLUMN 14, LINE 67,   change "for secures" to --for secure--

Signed and Sealed this
Eighth Day of April, 2014

Michelle K. Lee
*Deputy Director of the United States Patent and Trademark Office*